(12) United States Patent
Salomon

(10) Patent No.: US 10,795,977 B2
(45) Date of Patent: Oct. 6, 2020

(54) DIGITAL ASSET TRACEABILITY AND ASSURANCE USING A DISTRIBUTED LEDGER

(71) Applicant: Oracle International Corporation, Redwood Shores, CA (US)

(72) Inventor: Roberto Salomon, Brasília (BR)

(73) Assignee: Oracle International Corporation, Redwood Shores, CA (US)

( * ) Notice: Subject to any disclaimer, the term of this patent is extended or adjusted under 35 U.S.C. 154(b) by 357 days.

(21) Appl. No.: 15/864,970

(22) Filed: Jan. 8, 2018

(65) Prior Publication Data

US 2019/0065709 A1  Feb. 28, 2019

Related U.S. Application Data

(60) Provisional application No. 62/549,893, filed on Aug. 24, 2017.

(51) Int. Cl.
*H04L 9/00* (2006.01)
*H04L 9/32* (2006.01)
*H04L 9/06* (2006.01)
*G06F 21/16* (2013.01)
*G06F 8/41* (2018.01)
(Continued)

(52) U.S. Cl.
CPC .............. *G06F 21/16* (2013.01); *G06F 8/40* (2013.01); *G06F 8/41* (2013.01); *G06F 8/71* (2013.01);
(Continued)

(58) Field of Classification Search
CPC .......... G06F 21/16; G06F 21/44; G06F 21/64; G06F 21/57; G06F 8/71; G06F 8/41;
(Continued)

(56) References Cited

U.S. PATENT DOCUMENTS

2016/0283920 A1* 9/2016 Fisher ................... H04L 9/3297
2017/0048216 A1* 2/2017 Chow ................... H04L 63/061
(Continued)

OTHER PUBLICATIONS

Satoshi Nakamoto; www.bitcoin.org; "Bitcoin: A Peer-to-Peer Electronic Cash System"; 9 pages.
(Continued)

*Primary Examiner* — Alexander Lagor
*Assistant Examiner* — Vu V Tran
(74) *Attorney, Agent, or Firm* — Trellis IP Law Group, PC

(57) ABSTRACT

Various embodiments provide an apparatus, method, system, and/or instructions by which source code can be linked to a compiled binary, guaranteeing the origin of the binary and ensuring traceability of the binary file back to the source code that originated it. An example method includes determining a request to register a digital asset; computing a first hash of an initial source file of the digital asset; ascertaining a version of the initial source file; electing one or more nodes of a blockchain to commit the first hash to the blockchain in association with a version of the digital asset corresponding to the version of the initial source file; converting the source file into a binary file, resulting in a binary version of the digital asset; computing a second hash of the binary file; and committing the second hash to the blockchain in association with the version of the digital asset.

16 Claims, 7 Drawing Sheets

(51) Int. Cl.
  *G06F 21/64* (2013.01)
  *G06F 21/44* (2013.01)
  *G06F 8/40* (2018.01)
  *G06F 8/71* (2018.01)
  *G06F 21/57* (2013.01)

(52) U.S. Cl.
  CPC .............. *G06F 21/44* (2013.01); *G06F 21/57* (2013.01); *G06F 21/64* (2013.01); *H04L 9/006* (2013.01); *H04L 9/0643* (2013.01); *H04L 9/3239* (2013.01); *H04L 9/3263* (2013.01); *H04L 9/3297* (2013.01); *G06F 2221/0737* (2013.01); *H04L 2209/38* (2013.01)

(58) Field of Classification Search
  CPC . G06F 8/40; G06F 2221/0737; H04L 9/3239; H04L 9/3297; H04L 9/006; H04L 9/3263; H04L 9/0643; H04L 2209/38
  See application file for complete search history.

(56)  References Cited

U.S. PATENT DOCUMENTS

2017/0364552 A1* 12/2017 Pattanaik ............ G06F 16/2365
2018/0176229 A1*  6/2018 Bathen .............. H04W 12/1006
2018/0260212 A1*  9/2018 Wisnovsky ......... G06F 16/2365

OTHER PUBLICATIONS

Manav Gupta; "Blockchain for Dummies®, IBM Limited Edition"; 2017 by John Wiley & Sons, Inc.; 51 pages.

* cited by examiner

DIGITAL ASSET TRACEABILITY AND ASSURANCE USING A DISTRIBUTED LEDGER

CROSS REFERENCES TO RELATED APPLICATIONS

This application claims the benefit of U.S. Provisional Patent Application Ser. No. 62/549,893, entitled DIGITAL ASSET TRACEABILITY AND ASSURANCE USING A DISTRIBUTED LEDGER, filed on Aug. 24, 2017, which is hereby incorporated by reference as if set forth in full in this application for all purposes.

This application is related to U.S. patent application Ser. No. 15/829,684, filed on Dec. 1, 2017 (Trellis ref. ORACP0200/Client ref. ORA180001-US-NP), entitled SYSTEM AND METHOD FOR MANAGING A PUBLIC SOFTWARE COMPONENT ECOSYSTEM USING A DISTRIBUTED LEDGER, which is hereby incorporated by reference as if set forth in full in this application for all purposes.

BACKGROUND

The present application relates to computing, and more specifically to software and accompanying methods for tracing digital assets and implementing quality control in a networked computing environment.

Systems and methods for tracing digital assets are employed in various demanding applications, including tracing copywritten music, videos, software applications, files, etc.; for preventing and/or mitigating malicious cyberattacks (e.g., ransomware attacks), enforcing software Intellectual Property (IP) rights and identifying software owners, facilitating software updating, and so on. Such applications often demand efficient mechanisms for tracking and tracing digital asset origin.

Security conscious organizations and industries (e.g., intelligence services, healthcare, finance, etc.) often demand efficient, accurate, and virtually tamper-proof mechanisms for tracing or tracking digital assets. Such efficient mechanisms may enable the organizations to readily ascertain responsibility (e.g., for malware attacks) and to thereby mitigate associated liabilities. Digital asset traceability can also be important for protecting and enforcing intellectual property rights, e.g., software copyrights. Nevertheless, robust and efficient digital asset traceability and other preventative security and traceability mechanisms have remained elusive.

Conventionally, to track and trace digital assets, organizations, e.g., companies, governments, universities, etc., rely upon adjusting centralized control systems (e.g., app stores) that govern a particular computing environment. As such, for example, to defend against malware, such centralized control systems are sometimes equipped with additional security features, e.g., anti-malware software etc.

However, such security measures are frequently only implemented after security breaches have already occurred, e.g., after a zero-day malware attack. Generally, organizations using such centralized systems must often rely upon customer trust. Accordingly, breaches of the trust, such as in response to a malware attack, can be particularly problematic; not just for the customers, but for the organization, which may lose customers.

SUMMARY

An example embodiment discloses a system and method for facilitating software quality control and tracing in a networked computing environment, in part by employing repositories for source code and associated compiled binary files, which have been (or will be) registered, using cryptographical hashes of the files, in a distributed ledger, e.g., a blockchain. The historical record of the distributed ledger (i.e., entries that have already been committed to the ledger) can be updated and read from, but not readily altered by a given participant system. Blockchain records, i.e., blocks, store source code hashes and binary hashes in association with a software version and/or time stamp.

Accordingly, a given binary file can be traced to its source code by virtue of its version, and/or time stamp, as logged in the blockchain. Furthermore, the source code registrations and associated hashes are computed using a fingerprint (e.g., checksum, MD-5 hash, or other mechanism) of the source code in combination with workstation identifier, e.g., a Central Processing Unit (CPU) ID of the workstation on which the source code was developed (or from which it was dispatched to a source code repository), a Media Access Control (MAC) address, and/or User ID, etc.

The stored hashes (for both source code and corresponding binary) can be used to verify that a source code file and/or binary image have not been altered and to determine and/or verify the author and workstation corresponding to the associated software version.

Furthermore, various additional capabilities readily flow from use of the blockchain and accompanying functionality of the nodes as discussed herein. For example, mechanisms for facilitating digital asset version control, tracing, monitoring, and notifications; code release sequencing; IP protection; software bug tracing, notification, and mitigation; malware attack detection, tracing, and mitigation; quality assurance source-code filtering; customer detection of binary file corruption or alteration; component nesting tracking; production server flagging of unregistered code, and so on, can all be readily implemented using the blockchain and accompanying systems and methods discussed herein.

In addition, client systems (e.g., consumer systems) and associated customers can now readily verify the integrity of a downloaded binary file, in preparation for installation of the software, e.g., by comparing a hash of the downloaded binary file with the corresponding hash registered in the blockchain. Alternatively, or in addition, a cloud service provider may readily verify that a binary file (or files) to be sent to a production server has (or have) not been altered, e.g., by comparing the hash of the binary (to send to the production server) with the associated hash for the binary file that has been registered in the blockchain.

Another example method for facilitating digital asset traceability in a networked computing environment includes determining a request to register a digital asset in the networked computing environment; computing a first hash of an initial source file of the digital asset; ascertaining a version of the initial source file; electing one or more nodes of a distributed ledger of the networked computing environment to commit the first hash to the distributed ledger in association with a version of the digital asset corresponding to the version of the initial source file; converting the source file into a binary file, resulting in a binary version of the digital asset; computing a second hash, wherein the second hash is of the binary file; and committing the second hash to the distributed ledger in association with the version of the digital asset.

Another example method includes generating a source code file; storing the source code file in a repository; storing a hash of the source code file in a blockchain; compiling the source code file to generate a binary file (also simply called the "binary" herein); storing a hash of the binary file in a block of the blockchain; and distributing the binary file so that participants can use the distributed ledger to identify the origin of the source code file used in compiling the binary file.

Hence, by using distributed ledger technology (e.g., blockchain technology), or other suitable trusted database, as discussed herein, to ensure traceability of computer code from a source file to a binary via the blockchain, associated efficient methods for enabling digital asset version control; code release sequencing; IP protection; software bug tracing and mitigation; malware attack prevention, tracing, mitigation, and so on, readily flow.

Accordingly, various embodiments provide an apparatus, method, system or instructions for a method by which source code can be linked to a compiled binary, guaranteeing the origin of the binary and ensuring traceability of the binary back to the source code that originated it.

A further understanding of the nature and the advantages of particular embodiments disclosed herein may be realized by reference of the remaining portions of the specification and the attached drawings.

BRIEF DESCRIPTION OF THE DRAWINGS

FIG. 2-1 illustrates an example message sequence diagram illustrating example messaging that may occur between various modules of an example computing environment, e.g., the computing environment of FIG. 1.

FIG. 2-2 is a continuation of FIG. 2-1.

DETAILED DESCRIPTION OF EMBODIMENTS

Figure 1:
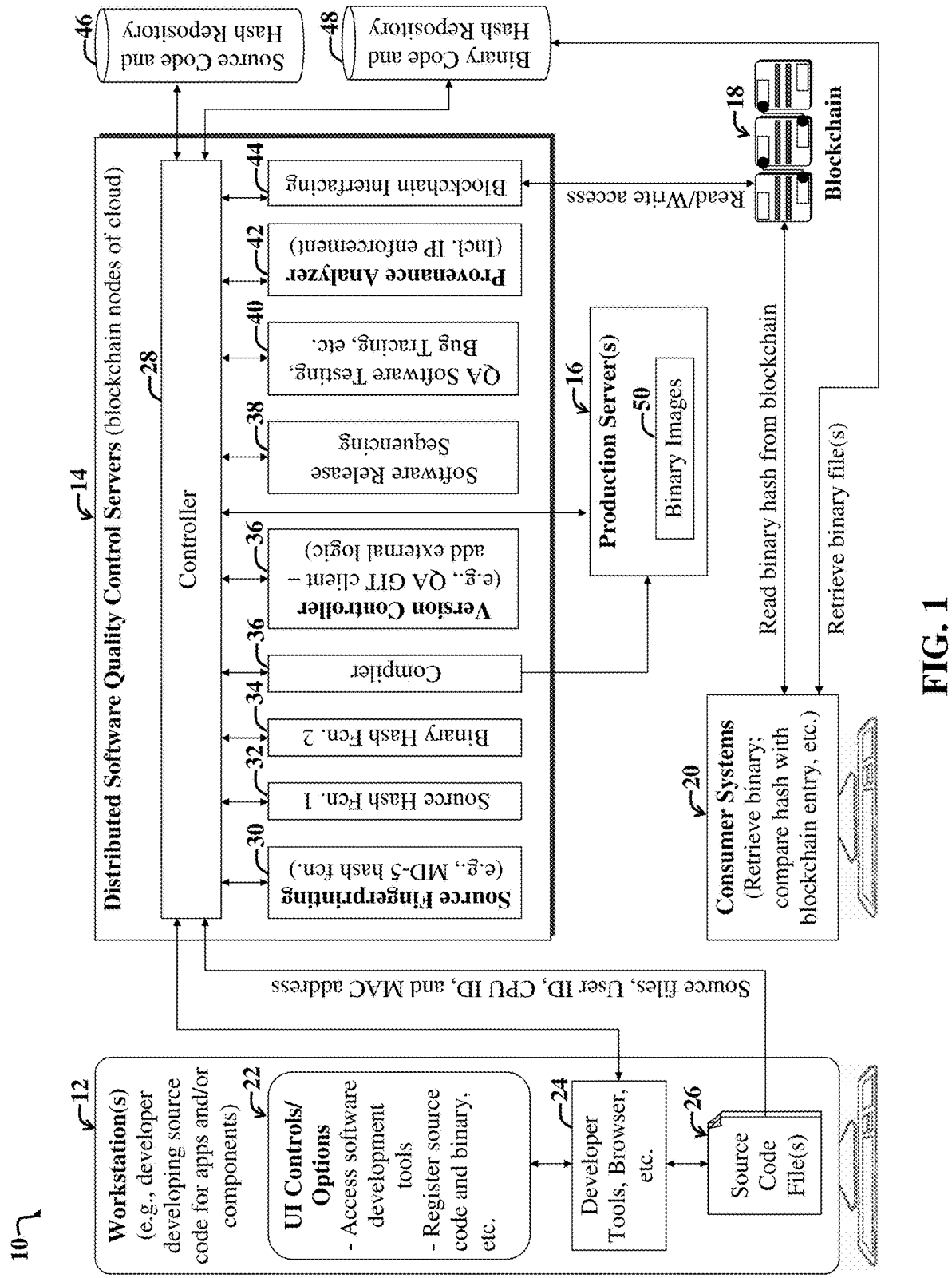
FIG. 1 illustrates a first example system and accompanying computing environment equipped to use a distributed ledger to facilitate linking source code of a software application or component to not only a compiled version (called the binary herein) but the workstation and developer with which the source code and binary are associated.

In many applications it is desirable and even critical to know details about the origin and subsequent modification of digital assets such as computer source code, executable code, data objects, etc. However, when these assets are exchanged and modified among different users or customers who may be in different places and unknown to each other it is difficult to authenticate and trace the assets. Companies have tried to solve this issue by concentrating on centralized version control systems. But this requires users to trust the central authority.

One way to reduce or eliminate the need for a central authority is to use a distributed ledger approach. Examples of a distributed ledger can be found in various blockchain implementations known today. One or more of the blockchain features can be adapted for use with digital assets as described herein. Although specific features may be described, not all of the features need be implemented in every embodiment. In some embodiments, third party code, including open source code, may be used to implement some or all of the functionality.

Features of version control systems can be combined with features of a distributed ledger system as described herein. In general, numbers and types of features of version control systems or similar digital asset development aids can be mated with distributed ledger functionality to provide desired tracing and organized modification and distribution of the asset. Existing components, such as Hyper-Fabric architecture components provided by the open source Hyperledger project, may be used. Features may be productized and sold as part of a secure development service. Established commercial companies, as well as free or open source software projects, can use the described features integrated or associated with their own version control or continuous deployment products.

For the purposes of the present discussion, a software ecosystem may be any computing environment that includes a collection of networked distributed computing resources configured to enable uploading and/or downloading of software components to/from the distributed computing resources (e.g., catalog instances, accompanying distributed blockchain, etc.). A networked computing environment may be any computing environment that includes intercommunicating computers, i.e., a computer network, such as a local area network (LAN), wide area network (WAN, e.g., the Internet), cloud infrastructure and services, etc. Similarly, a networked software application may be computer code that is adapted to facilitate communicating with or otherwise using one or more computing resources, e.g., servers, via a network.

Note that collections of computing resources, e.g., computer systems that may intercommunicate via a network of the ecosystem, are called nodes herein. A given node, e.g., an instance of a software component catalog (called catalog instance herein), may include software for intercommunicating with other nodes and selectively sharing data (e.g., replicas of blockchains containing registration information for the ecosystem); for facilitating creation of transactions (e.g., via user interface software for guiding completions of various registrations), and for ensuring conformance with rules of the ecosystem, thereby enabling implementation of a peer-to-peer ecosystem.

For the purposes of the present discussion, a peer-to-peer network or ecosystem may be any collection of computing resources, e.g., computer systems and/or software applications, i.e., nodes, which are distributed across a computer network, and which may intercommunicate to facilitate sharing process workloads.

Note that conventionally, peers or nodes of a peer-to-peer network have similar privileges to access data and functionality provided by the network. However, as the term is used herein, peers or nodes of a peer-to-peer network need not be similarly privileged. For example, some nodes, called full nodes, are maximally privileged, i.e., maintain privileges to read from the ecosystem blockchain and write thereto. Other less privileged nodes may require use of a full node as a proxy to access the ecosystem blockchain. Note that the terms "peer-to-peer network" and "peer-to-peer ecosystem" may be employed interchangeably herein.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object associated with a transaction); performing an enterprise-related task, such as promoting, hiring, and firing enterprise personnel, placing orders, calculating analytics, launching certain dialog boxes, performing searches, and so on.

A blockchain may be a sequenced list of linked records, called blocks, wherein the blockchain can grow by adding new blocks to an end of the blockchain, but the insertion of earlier blocks is prohibited unless later blocks are first unwound or removed from the blockchain. Different blocks of a blockchain are often timestamped upon incorporation into the blockchain. Blockchains may be implemented using distributed or networked software applications, e.g., which may be installed on nodes of a given computing environment or ecosystem. The links between blocks may be implemented via implementation of one or more hashes applied to new blocks, wherein the one or more hashes leverage or use information from one or more previous blocks. Blockchains can be used to implement distributed ledgers of transactions.

For the purposes of the present discussion, a distributed ledger may be a collection of shared digital data, which is shared among plural nodes of a network, copies of which may be replicated and stored among the plural nodes. Data maintained by a distributed ledger may be synchronized among the nodes.

Accordingly, a distributed ledger may act as a type of distributed database, i.e., mechanism for storing data among different entities coupled to a network of the entities. A node may be any computer system and/or software application and/or software system, or groups thereof that are coupled to a network. The nodes discussed herein are generally called "catalog instances," as they facilitate access to data stored in the catalogs by other nodes and/or participants of the accompanying computing ecosystem.

A transaction may be any collection of information describing an event, status, property, or other information, descriptive of one or more aspects of the ecosystem, wherein the one or more aspects may include participating developer entities, software component consumer entities, contributor entities, proxied ecosystem participants and systems, software component interrelationships, instances of software component downloads and/or uploads, support status of a software component, component provenance information, and so on. Depending upon the context in which the term is used, a transaction may refer to a collection of data describing an activity in the ecosystem, e.g., a developer entity registration, a namespace registration, a contributor registration, and so on; or alternatively, a transaction may refer to the actual activity, e.g., downloading a component.

Transactions representing activities or tasks may be fully automated or may also contain human workflow tasks such as manual approvals or other verification activities. Thus, although a transaction may be expressed as a single thing (e.g., collection of information) in the blockchain, some forms of transactions may actually be broken down into discrete sub-transactions which can be recorded in the ledger as the workflow is processed. Accordingly, depending upon the context in which the term is used, the term "transaction" may also refer to the act of conveying a collection of information (e.g., computing object) and may also refer to the actual collection of the information (e.g., computing object).

For example, if an individual software developer (e.g., a component contributor) registers with a component ecosystem, as discussed herein, information pertaining to (e.g., documenting) the contributor registration process may be propagated to one or more unverified queues of catalog instances in preparation for incorporation into the blockchain of the ecosystem. The collection and/or transfer of the information may be called a transaction, and the computing object maintaining the collected information may also be called the transaction, e.g., developer registration transaction.

A given node may be allocated different privileges in a given computing environment or ecosystem. Nodes with similar privileges, as it pertains to implementation of one or more particular tasks, are called peers for the purposes of completing the tasks. For the purposes of the present discussion, a peer-to-peer ecosystem may be any ecosystem or computing environment implemented, at least in part, via one or more distributed or networked software applications implemented via different nodes or peers of the of ecosystem.

Various example embodiments discussed herein are implemented via a peer-to-peer software ecosystem that includes nodes of software component catalog instances. Example software component catalog instances, discussed more fully below, may run various software applications, including software for maintaining and managing a local data store (which may include a database of software components); software for implementing security and permissions functionality; software for generating User Interface (UI) display screens for enabling various types of registrations (examples of which are discussed more fully below); for managing unverified transaction queues for the ecosystem; for communicating with other catalog instances; for maintaining replicas of the ecosystem blockchain; for computing, i.e., verifying or validating new blocks for the blockchain of the ecosystem; for submitting transactions for verification (and inclusion in a blockchain block) by one or more catalog instances of the ecosystem; for implementing any algorithms for selection of catalog instances to perform computations required to add one or more blocks to the blockchain; for computing hashes required to add blocks to the blockchain, and so on.

Generally, communities of developers and/or businesses may use software ecosystems to cooperatively interact with a shared market for software and services using a common technological platform, which enables or facilitates exchange of information, resources and components.

A software ecosystem can implemented as an open ecosystem of re-usable software components for use by developers, vendors and customers. Such an ecosystem may be built around networked or "cloud" infrastructure and accompanying processes and services. However, although specific embodiments of the invention may be described with reference to specific processing platforms, techniques and infrastructures, other variations are possible and may be adapted for different systems.

Conventionally, software developers may subscribe to certain cloud services to facilitate development of software applications and storage of associated files. A cloud service that is configured for software application or process flow development is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in the PCS database.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

Certain embodiments discussed herein are particularly useful for development, deployment, and implementation of process-based software applications. A process-based software application may be any software application definable by one or more sequences of steps, also called process elements or software activities. The terms "process element," "flow element," "software element," and "software process element" may be employed interchangeably herein to refer to any step, e.g., event, activity, gateway, sub-process, and so on. A sequence of steps of a process-based software application may be called a process flow. Process flows are often modeled and illustrated via swim lanes in a User Interface (UI) display screen. Process-based applications are often implemented via composite applications that may leverage different web services and associated software components for different process steps.

For clarity, certain well-known components, such as hard drives, processors, operating systems, power supplies, routers, Internet Service Providers (ISPs), workflow orchestrators, process schedulers, process clouds, business process management systems, ecosystem developer entities, ecosystem contributor entities, Integrated Development Environments, proxy systems, identity management systems (e.g., identity domains), Certificate Authorities (CAs), and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment equipped to use a distributed ledger 18 to facilitate linking source code of a software application or component to not only a compiled version (called the binary herein) but the workstation 12 and developer with which the source code and binary are associated. The overall system 10 acts as software ecosystem, whereby developers using workstations 12 can provide software, e.g., to a source code repository 46 and binary repository 48, which can be made selectively available to customer systems 20 and/or a production server 16, as discussed more fully below.

The example system 10 includes one or more workstations (e.g., computers operated by respective software developers) 12 in communication with distributed servers 14 (e.g., a cloud) via a network, such as the Internet. The example workstation 12 includes client-side software 24 for developing software applications. The client-side software 24 may include client-side developer tools for developing source code files 26, and a browser for accessing functionally provided by the distributed servers 14.

Note however, embodiments are not limited to client-side software development environments but may also include server-side development environments and other Integrated Development Environments (IDEs) that may include browser-accessible web-based or cloud-based software development functionality. Furthermore, the workstation 12 may also include a compiler, as opposed to just relying upon a server-side compiler 36.

The client-side software 24 facilitates displaying various User Interface (UI) display screens 22, which include user options and controls for accessing software development functionality and for initiating registrations of source code, binary, etc., with the blockchain 18 via the distributed servers 14, which include functionality for enabling servers of the distributed servers 14 to act as blockchain nodes.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A UI control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, while in FIG. 1, the distributed ledger 18, e.g., blockchain, appears as a separate entity from the workstation 12 and distributed servers 14, that in practice, the blockchain 18 is implemented as a distributed set of replicated data and functionality (e.g., blockchain replicas), which may be distributed about the distributed servers 14.

Furthermore, in FIG. 1, while implementation of a source-code hash function (also simply called the source hash function) is shown as being implemented by one or more of the distributed servers 14 (e.g., distributed software quality control servers), note that instead, such hash function can be implemented on the workstation 12. Furthermore, while the distributed servers 14 are shown as including blockchain interfacing functionality 44, note that in certain embodiments, such functionality may also be included in the workstation 12. Furthermore, the workstation 12 may be equipped with yet additional functionality, e.g., such that the workstation 12 may act as one of the servers of the distributed servers 14, without departing from the scope of the present teachings.

The distributed servers 14 are called "quality control servers" herein as they incorporate code and functionality for facilitating software bug tracing, malware detection, software release sequencing, software IP protection and enforcement mechanisms, and so on, as discussed more fully below. Such functionality helps to ensure quality of software provided to consumer systems 20 and/or to the production server 16 via the ecosystem 10.

In the present example embodiment the distributed servers 14 include a controller 28, which incorporates middleware that facilitates interfacing various modules 30-48 and controlling intercommunications and routing between the various modules 30-48. The controller 28 also handles and routes communications with the workstations 12, and may further include instructions or functionality for facilitating UI rendering instructions for the workstation UI controls and options 22.

The example server-side modules and functionality 30-48 include a source code (also simply called "source" herein) fingerprinting module 30, a source hash function 32, a binary hash function 34, the compiler 36, a software version controller 36, a software-release sequencing module 38, a Quality Assurance (QA) module 40, a software provenance analyzer 42, and blockchain interfacing functionality 44. The controller 28 also acts as a gate keeper for the source code repository 46 and binary code repository 48, and communicates with the production server 16, and optionally, the consumer systems 20, as discussed more fully below.

In an example scenario, a developer using the workstation 12 who has been permissioned to supply source code to the distributed servers 14 (e.g., by submitting credentials, e.g., User ID) uses the developer tools 24 to create one or more source code files 26. The one or more source code files 26 represent source code containing programming language instructions defining one or more software programs and/or components.

The developer using the workstation 12 then selects an option (e.g., from among the UI controls and options 22) to register the source code with the distributed servers 14. The source code files 26 are then delivered to the controller 28 of one or more of the distributed servers 14, along with workstation identifying information, e.g., CPU ID, MAC address, and User ID. Note that in some embodiments, other numbers or combinations of one or more numbers or identification codes, which are suitable to identify the workstation 12 and associated developer, may be used instead.

The controller 28 then inputs the source code file(s) to the source fingerprinting module 30, so as to obtain a fingerprint of the source code file(s) in accordance with a fingerprinting algorithm implemented by the fingerprinting module 30. Exact details of the fingerprinting algorithm are implementation specific and may vary, depending upon the needs of a given implementation. In the present example embodiment, the source fingerprinting module 30 uses an MD-5 hash algorithm, or other suitable checksum or hash function. The output of the source fingerprinting module 30 represents a number (or code, e.g., a message digest) that can be used to identify the input source file(s). In theory, different source files, including even slightly altered versions of a given source file result (absent collision) in a different source code fingerprint output from the source fingerprinting module 30.

The resulting source code fingerprint is then routed by the controller 14 to the source hash function 32, and submitted as input thereto, in combination with the CPU ID, MAC address, and User ID, which were supplied to the controller 28 (from the workstation 12) along with the source files 26. The source hash function 32 then runs a hash algorithm with the source file(s) 26, CPU ID, MAC address, and User ID as inputs, producing a source hash (also called source code hash herein) as output.

Accordingly, the source hash returned by the source hash function 32 contains information about the workstation 12 (e.g., via the CPU ID and MAC address), the user (e.g., via the User ID), and the source files 26. The resulting source hash and associated source code files 26 are then routed by the controller 28 for storage in the source code and hash repository 46.

Note that the controller 28 may first store the source code files 26 in the source code and hash repository 46 before routing it to the source fingerprinting module 30, without departing from the scope of the present teachings. Furthermore, note that the received CPU ID, User ID, and MAC address may be maintained in local cache of the distributed servers 14 and/or also temporarily stored in the source code and hash repository 46.

The controller 28 then uses the blockchain interfacing code 44 to generate a corresponding transaction (containing the source hash) for registration via the blockchain 18. When a block of the blockchain 18 that contains the source hash is verified and committed to the blockchain 18 by one or more nodes (where, in this case, nodes correspond to the distributed servers 14) of the blockchain 18, the source hash is said to have been registered with the blockchain 18 or committed to the blockchain 18.

The blockchain interfacing module 44 includes functionality for not just verifying and committing blocks to the blockchain 18, but also for communicating with other nodes 14 via their respective blockchain interfacing modules 44, and for complying with any consensus algorithm for determining which of the nodes 14 will perform the transaction and block verification and committing functions to commit a particular block to the blockchain 18. The blockchain interfacing module 44 further includes instructions for maintaining an updated local blockchain replica and for propagating indications of received transactions (that are to be committed to one or more blocks of the blockchain 18) to other participant nodes 14.

In the present example embodiment, a node from among the nodes 14 is selected in accordance with a proof-of-stake consensus mechanism, as opposed to a proof-of-work mechanism. For the purposes of the present discussion, a proof-of-stake mechanism may be any node-selection algorithm that selects one or more nodes to perform processing to commit a block to a blockchain, which does not involve a race to compute blocks (i.e., proof-of-work mechanism). The exact proof-of-stake method used may vary depending upon the needs of a given implementation.

In the present example embodiment, the node that is selected to commit a particular block to the blockchain 18 is the node that first received the source files 26 from the workstation 12. Alternatively, or in addition, nodes can also be screened and selected based on permissions of each of the nodes 14; available computing resources; or other criteria. One or more identity domains may manage and allocate permissions among authenticated nodes 14 and workstations 12 and other users (e.g., consumers using consumer systems 20) of the ecosystem 10. This can reduce or eliminate the need for more computationally expensive proof-of-work mechanisms.

Nevertheless, in the present embodiment, when a particular node 14 commits a block to the blockchain 18, the node 14 adds identifying indicia to the block, thereby enabling the nodes 14 to validate the origin of blocks. Note that in alternative implementations where the workstations 12 act as nodes of the blockchain 18, the requisite identifying indicia may already be included in the source hash. This can happen when the workstation 12 that is selected to commit the block is also the provider of the source code files 26 to be registered.

Note that while the blockchain 18 is shown as a chain of linked blocks (linked by hash pointers to the previous block), that in practice, nodes 14 of the blockchain 18 will also maintain so-called unverified queues. The unverified queues are also replicated among the nodes 14. The unverified queues contain one or more transactions that are being gathered in preparation for being committed into a block of the blockchain 18. While in the unverified queue, various testing can be performed, e.g., to facilitate confirming the validity and integrity of the transaction data in the unverified queue before committal to the blockchain 18. Such use of an unverified queue is discussed more fully in the above-identified related U.S. patent application Ser. No. 15/829,684, filed on Dec. 1, 2017 (Trellis ref. ORACP0200/Client ref. ORA180001-US-NP), entitled SYSTEM AND METHOD FOR MANAGING A PUBLIC SOFTWARE COMPONENT ECOSYSTEM USING A DISTRIBUTED LEDGER, which is incorporated by reference herein.

In the present example embodiment, before the source hash is registered in the blockchain 18, various types of quality-control processing and testing occur. For example, the version controller 36 determines the version of the source files 26, which corresponds to the version of the software application or component defined thereby. The version controller 36 may also add external logic coupled with the source files 26 that ensures that only source files 26 that have been processed by the QA module 40 will be released for further processing, e.g., compilation by the compiler 36. This can result in higher quality code being released for compilation and further testing, which can reduce costs associated with low-quality or infected code being released.

In the present example embodiment, the QA module 40 includes multiple stages of analysis, whereby if the code does not pass one stage of the processing, further processing may not be needed. Examples of tests that can be run by the QA module 40 include detecting and tracing software bugs (e.g., logical errors, such as "divide by zero" possibilities) and/or malware; notifying the developer of any found bugs or instances of malware; thereby helping to mitigate any bugs or other problematic traits of the software.

Note that in some implementations, the version of a source file need not have a title, but instead can be a timestamp (e.g., file completion date) and/or other metadata included with the source files 26. In addition, or alternatively, additional timestamps may also be used as a replacement for, or in combination with, a developer-selected name for the source files 26. An additional timestamp may be applied by the servers 14 upon receipt of the source code files 26. Yet another time stamp is applied to the block of the blockchain 18 in which the source hash is registered.

Such timing information can be used by the provenance analyzer 42 to help ensure that a given set of source files 26, received by someone other than the original developer, is not violating the original developer's IP rights to the developed software. The provenance analyzer 42 can be applied to the source code files 26 submitted by developers to facilitate such provenance determinations applicable to IP considerations. Furthermore, note that the provenance analyzer 42 can also be applied to compiled binary, e.g., as maintained in the binary code and hash repository 48. In the event of an IP conflict between developers, the provenance analyzer 42 can help to establish which developer was first to submit the source code files to the servers 14.

Furthermore, note that in the present embodiment, neither the production servers 16 nor the consumer systems 20 need to have access to the source code files 26 maintained in the source code and hash repository 46. This further helps to reduce chances that one of the operators of the consumer systems 20 will readily incorporate other developers' source code files or sections thereof into their own code with a license from the original developer.

Note that the provenance analyzer 42 also includes functionality for producing timelines of code development and revisions. The timeline, version sequence, and/or software patch sequence is then used by the software-release sequencing module 38 to ensure that code is released in the proper order. Note that the software release sequencing module 38 and the provenance analyzer 42 can both use registration data (e.g., source hash and/or binary hash) for a particular software application. The registration data also includes timestamp information, and the hashes can be used to confirm that a particular source file and/or binary file has not been altered or changed from a registered version.

After registration of the source hash output from the source hash function 32 (and maintained in the source code and hash repository 46 in association with the corresponding source code) is registered in the blockchain 18, and after processing by various modules, e.g., the QA module 40, the software-provenance analyzer 42, and the software-release sequencing module 38, the source files 26 may proceed to compilation, i.e., conversion to binary (one or more binary files). After conversion to binary (via the compiler 36), a corresponding binary hash is computed by the binary hash function 34 using the binary output from the compiler 36.

To obtain binary from the compiler 36, the controller 28 inputs the source code files 26 to the compiler 36, which returns binary. The resulting binary may then be stored in the binary code and hash repository 48 in association with version information, which may be the same version information as the source code files 26, as determined by the provenance analyzer 42. Note that versions of binary files in the binary code and hash repository 48 can be matched with corresponding versions of the source code in the source code and hash repository 46, e.g., to find versions of binary code that match the corresponding versions of source code files. This helps the provenance analyzer 42 and the QA module 40 to complete tracing operations, e.g., for the purposes of IP enforcement, bug tracing and notifications (back to the original developer), malware detection and tracing, etc.

Note that exact details of the binary hash function and source hash function 32 are implementation specific and may vary, depending upon the needs of a given implementation. Those skilled in the art with access to the present teachings may readily select and/or develop a suitable hash function to meet the needs of a given implementation, without undue experimentation.

In a continuous deployment scenario, the software-release sequencing module 38 releases source code to the compiler 36 so as to produce binary output (corresponding to the binary images 50) that is delivered to the production server 16, for execution thereby, in the sequence determined by the software-release sequencing module 38.

Alternatively, or in addition, the software-release sequencing module 38 may use already compiled binary that exists in the binary code and hash repository 48. In this case, binary files (for a particular software application stored) in the binary code and hash repository 48 are sequentially released to the production server 16, via the controller 28, for running as binary images 50.

In a client-side installation scenario, consumers (e.g., customers of cloud services of a cloud that hosts the distributed servers 14 that wish to download and install binary on their consumer system 20) may install a blockchain client on their systems 20 that allows read access to the blockchain 18. Once the consumer systems 20 have obtained a set of one or more binary files for installation and execution, e.g., from the binary code and hash repository 48, then one or more blockchain entries corresponding to the downloaded binary may be used to confirm that the downloaded binary exhibits a hash that matches what is expected in view of the corresponding hash entry or entries in the blockchain 18. Accordingly, consumers can now readily determine or confirm that a particular downloaded binary file has not been tampered with or otherwise corrupted or altered.

In FIG. 1, the consumer systems 20 are shown communicating directly with the binary code and hash repository 48. However, the consumer systems 20 may instead (or in addition) selectively access the binary from the binary code and hash repository 48 via the controller 28. Alternatively, the consumer systems 20 may obtain binary output from the compiler 36, via the controller 28.

In the present example embodiment, the consumer systems 20 are only granted access to read the blockchain 18; to access the binary code and hash repository 48; and/or to access the distributed servers 14, after they have been authenticated and appropriately permissioned. Public Key Infrastructure (PKI) may be used as part of the interaction between the consumer systems 20 and other modules of the overall system 10. In this case, depending upon permissions granted to particular consumers of the consumer systems 20, the consumers may be issued one or more public keys and one or more private keys for use in accessing other modules of the system 10.

Note that a message (e.g., a message containing an encrypted binary file for client-side installation on one of the consumer systems 20) that is encrypted with the public key can be accompanied by a digital signature (that represents a combination of the message body and the private key). The receiver of the message may use the public key to check that the digital signature is valid (i.e., made with a valid private key). However, a valid private key will be required to decode the entire message that has been encoded with the public key, and to thereby allow installation of the downloaded binary.

Note that other types of asymmetric encryption (other than public-key encryption) may be used to implement embodiments, without departing from the scope of the present teachings. Furthermore, note that principles of embodiments discussed herein need not be limited to already trusted computing environments, as is the example ecosystem 10. The example ecosystem 10 is said to be already trusted, as all participants have already been authenticated and permissioned for participation in the ecosystem 10.

Note that while the embodiment discussed with reference to FIG. 1 discusses registrations of source code hashes and binary hashes, in practice, virtually every interaction occurring in the ecosystem 10 (e.g., that occurs during the process of creating a software application for distribution) can be securely logged in the blockchain 18 or other trusted database mechanism. Accordingly, the blockchain 18 may maintain a detailed audit trail that may record virtually every code change, build, code libraries used, and packaging events that contribute to the creation of a given software artifact. Even instances of software component and/or application testing (e.g., whereby one application or component is used as part of another) can be readily tracked and traced. Use of the blockchain 18 can facilitate alternative embodiments, e.g., wherein the blockchain 18 is publicly viewable (but not alterable by the public), enabling consumers and potential consumers to confirm and trust the provenance of code made available in the ecosystem 10, and to potentially ascertain who worked on a given software application.

Note that use of the system 10 and accompanying use of the blockchain technology as discussed herein enables the tracing of any binary file or executable image in a production server to a specific set of one or more source files. This helps to provide an additional layer of security. Embodiments discussed herein are anticipated to reduce the operational risk index that directly affects the bottom line of various organizations, e.g., financial institutions.

A quality control organization or system now has a mechanism of releasing the code for compilation by adding the appropriate release order to the blockchain 18. Logic (e.g., in the form of a Chain Code or external logic) can be added so that only code approved by the quality control organization or system is cleared for compilation and testing. This can result in higher quality code being released for compilation and testing, resulting in less costs due to inappropriate or low quality code being released for the testing.

Software testing is now able to identify which code files result in which binary image allowing the test process to assist development by correctly identifying which file, or files, need correction.

Accordingly, in summary, basic steps and/or features of an embodiment can include one or more of the following:

1—A hash generated from a workstation's Media Access Control (MAC) Address, CPU ID and User ID along with a hash (e.g., MD5, etc.) of the code is attributed to a source code file generated in any specific workstation.

2—The source file is checked-in to a repository (e.g., the source code and hash repository 46) and the file's hash is stored as a block in a blockchain 18.

3—If a file is altered and a new version is checked in the existing version control system, a new block, using the same hash logic as in step 1 is added to the blockchain 18 to evidence the evolution of the code and for tracing file versions back to their developers and editors.

4—Quality Control 4.1—A quality control organization now has a mechanism of releasing the code for compilation by adding the appropriate release order to the blockchain 18.

4.2—Logic (in the form of a Chain Code or external logic) can be added so that only code approved by the quality control organization or system (e.g., represented by the servers 14) is cleared for compilation and testing. This can result in higher quality code being released for compilation and testing, resulting in less costs due to inappropriate or low quality code being released for the testing.

5—When the source code is compiled, the hash of the resulting binary is added as a new block on the blockchain 18 indicating the code version that has been compiled. The hash of the generated binary will then allow tracing any binary in production to a specific code written in a specific workstation by a specific developer.

6—Testing 6.1—Software testing is now able to identify which code files result in which binary image. This can allow the test process to assist development by correctly identifying which file, or files, need correction.

6.2—As with quality control steps, approved code is released for packaging and production by adding an appropriate release order to the blockchain 18.

7—The whole blockchain 18, or parts of it, can be made public and distributed in a network of servers which ensures the integrity of the data in the database. Systems can be audited to identify the original source code without the auditors need to access the original source files.

In an embodiment where any participant (e.g., any operators of the workstations 12 and any operators of the consumer systems 20) can generate and commit a block to the blockchain 18, blocks that are trusted for inclusion in the blockchain 18 are determined by a consensus model. The consensus model in some blockchain implementations such as "Bitcoin" use a "proof of work" model. In the proof of work model, participants' computers are used as hashing nodes, which compete to calculate a very specifically formatted hash code. However, this consensus model can be overly expensive and energy-inefficient for some implementations, such as business environments where there is already a degree of trust and/or authentication. Rather than proof-of-work, a model based on proof-of-stake, as set forth more fully above, can be used.

Accordingly, in embodiments that assume a more controlled environment, blocks do not need to be "mined" by computing-intensive hash solving. Rather, the origin of blocks can be validated by using digital signatures and authentication that will be validated by the peer nodes of the blockchain network. Signature authentication can be provided by existing components such as in the Hyperledger architecture referenced above.

Nevertheless, embodiments are not limited to use of proof-of-stake, and proof-of-work may still be used in some implementations, especially implementations involving potentially untrusted nodes.

Figures 1, 2:
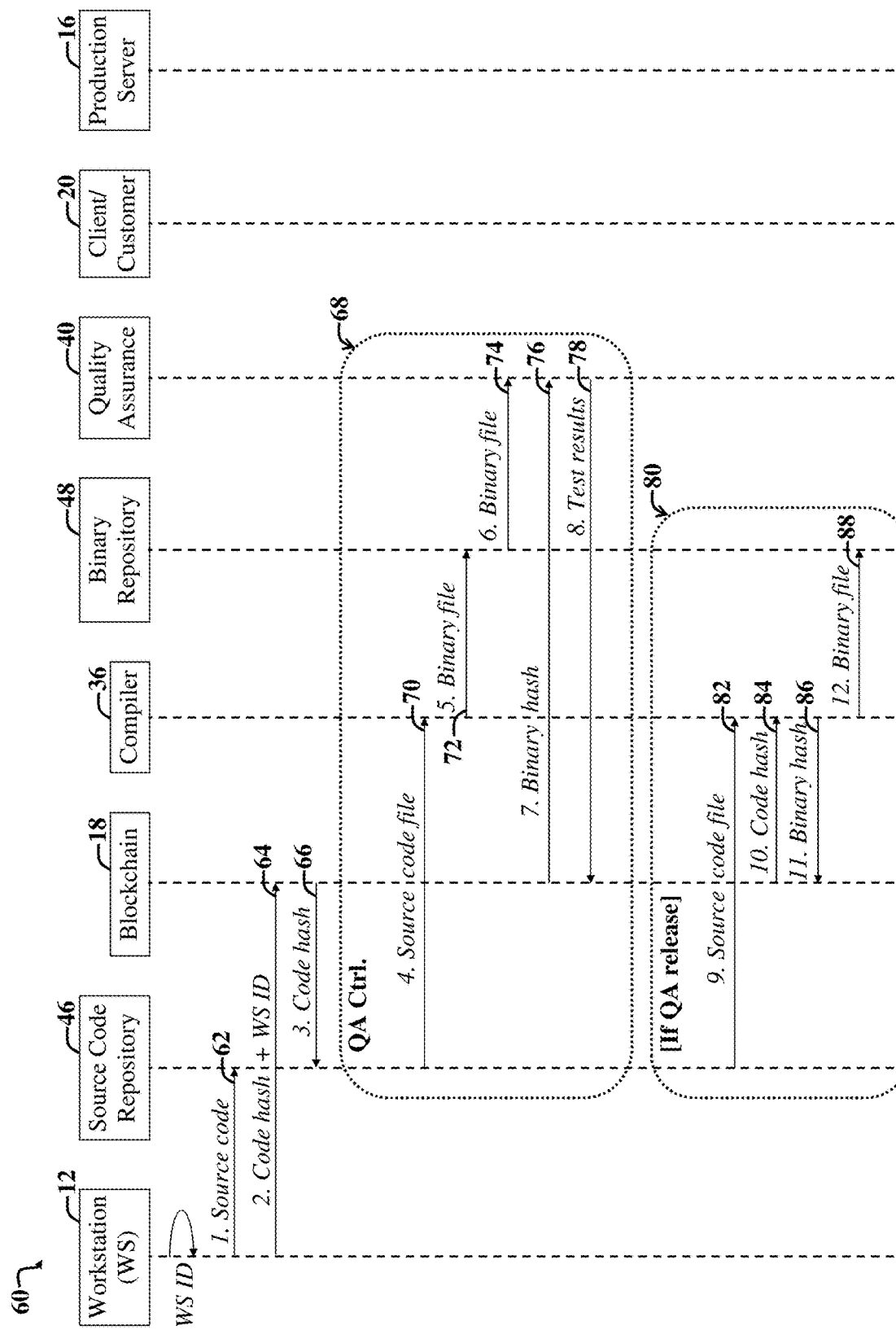
Figure 2:
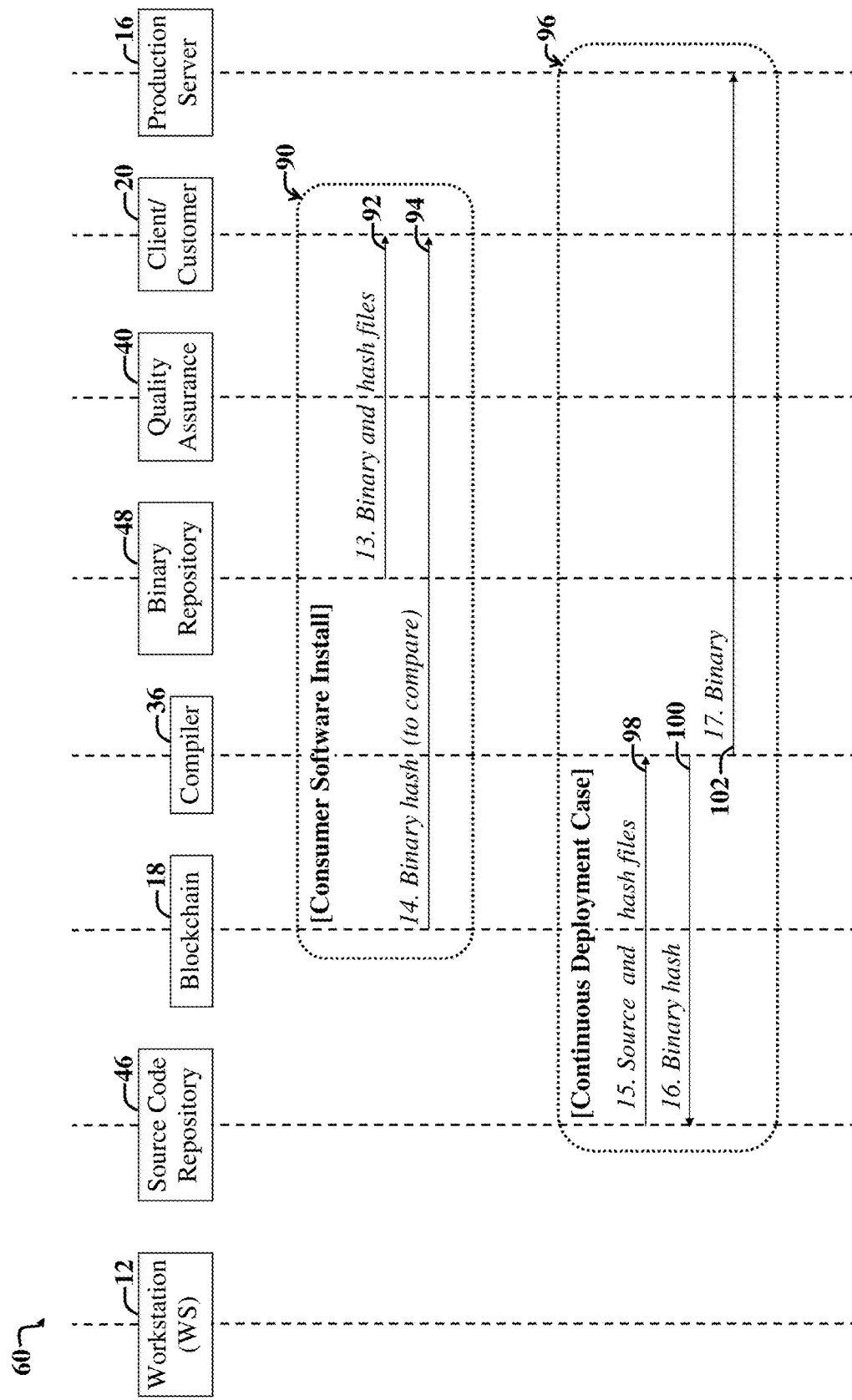

FIG. 2-1 illustrates an example message sequence diagram illustrating example messaging that may occur between various modules 12, 46, 18, 36, 48, 40, 20, 16, of an example computing environment, e.g., the computing environment 10 of FIG. 1. Note that an overall message sequence 60 extends from FIG. 2-1 through FIG. 2-2 and includes different groups of message sequences, e.g., a QA control sequence 68, a compiler-release sequence 80 (which occurs that if a source code file is released for use by a consumer), a consumer software installation sequence 90 (as shown in FIG. 2-2), and a continuous deployment sequence 96 (also shown in FIG. 2-2).

Furthermore, note that some of the scenarios illustrated in FIGS. 2-1 and 2-2 differ from those discussed with reference to FIG. 1. Accordingly, the example ecosystem 10 of FIG. 1 may represent an alternative embodiment of the system implementing the message sequencing 60 in FIG. 2, and vice versa.

For example, unlike in FIG. 1, the sequence 60 in FIGS. 2-1 and 2-2 suggests that the source code hash is being computed on the workstation 12, and then registered with the blockchain 18 by software running on the workstation 12. As such, the workstation 12 can also include blockchain interfacing code (that is not shown as residing on the workstation 12 of FIG. 1).

Furthermore, in FIGS. 2-1 and 2-2, the binary hash is computed by one or more modules of the compiler 36, as opposed by a separate binary hash function module 34 (in FIG. 1) running on one or more of the servers 14 of FIG. 1. Note that in FIG. 1, hash computations are offloaded to the one or more distributed quality control servers 14, which act as nodes hosting blockchain replicas, forming the distributed ledger, i.e., blockchain 18.

Furthermore, note that in FIGS. 2-1 and 2-2, other types of common messaging are omitted for clarity, e.g., messaging involving the sending and receiving of request messages. However those skilled in the art with access to the present teachings may readily implement the appropriate request messaging and other types of messaging to meet the needs of a given implementation, without undue experimentation.

The overall message sequence 60 includes a first message 62, which includes source code that is sent from the workstation 12 to the source code repository 46. A second message 64 sends a source code hash and workstation identification information to the blockchain 18 for registration. In a third message 66, the code hash that was registered in the blockchain 18 via the previous message 64 is forwarded to the source code repository 46 for storage in association with the corresponding source code (which may be included in one or more source code files).

Next, the QA control sequence 68 is shown. The QA control sequence 68 includes sending a fourth message 70 from the source code repository 46 to the complier 36. The fourth message 70 includes the source code file that was previously stored in the source code repository 46, and its hash registered in the blockchain 18.

The compiler 36 then converts the source code file into a binary file, which is sent from the compiler 36 to the binary repository 48 as a fifth message 72. The binary repository 48 then releases the binary file to the QA module or service 40 for analysis, via a sixth message 74. If a binary hash for the binary file has already been registered in the blockchain 18, then the QA module 40 retrieves the binary hash from the blockchain 18 via a seventh message 76.

After the QA module 40 completes testing of the binary file, the test results are forwarded for registration with the blockchain 18 in association with the binary file. If the test results are passing results, then the compiler-releasing sequence 80 is performed.

The compiler-releasing sequence 80 includes a ninth message 82 that is sent from the source code repository 46 to the compiler 36. The ninth message 82 includes the source code corresponding to the binary that was tested by the QA module 40. The compiler 36 the retrieves the previously registered source code hash from the blockchain 18, via a tenth message 84.

The compiler 36 then uses the retrieved source code file and source code hash to compute a binary hash in accordance with a binary hash function implemented by the compiler 36. The computed binary hash is then sent to the blockchain 18 for registration, via an eleventh message 86. (Note that this scenario differs from FIG. 1, where the binary hash is shown being computed separately from the compiler 36.) The binary file is then sent by the compiler 36 to the binary repository 48, via a twelfth message 88.

FIG. 2-2 is a continuation of FIG. 2-1. After the binary file has been stored in the binary repository 48, via the twelfth message 88 of FIG. 2-1, an optional consumer software installation sequence 90 is performed.

The consumer software installation sequence 90 includes releasing binary and associated binary hash files to a client or customer (called a consumer herein) system 20, via a thirteenth message 92. The consumer system 20 then retrieves the binary hash that was registered in the blockchain 18, via a fourteenth message 94. The consumer system 20 may then compare the hash files obtained from the binary repository 48 with the registered hash files to ensure that the downloaded binary has not been corrupted or altered, i.e., the binary hashes match.

Next, an alternative continuous deployment sequence 96 occurs. The continuous deployment sequence 96 includes the compiler 36 retrieving source code and corresponding source code hash files from the source code repository 46, via a fifteenth message 98. The compiler 36 uses the retrieved source code to generate a binary file and to compute a hash of the binary file.

In the present example embodiment, the resulting binary hash is shown as being transferred to the source code repository 46 for storage in association with the corresponding source code stored therein, via a sixteenth message 100. Note however, that the binary hash may, alternatively or additionally, be transferred for storage in the binary repository 48 (e.g., if it has not already been stored therein).

Next, the compiler 36 forwards the binary (e.g., as an executable image) to the production server 16, e.g., in preparation for hosting the software application as a web application.

Figure 3:
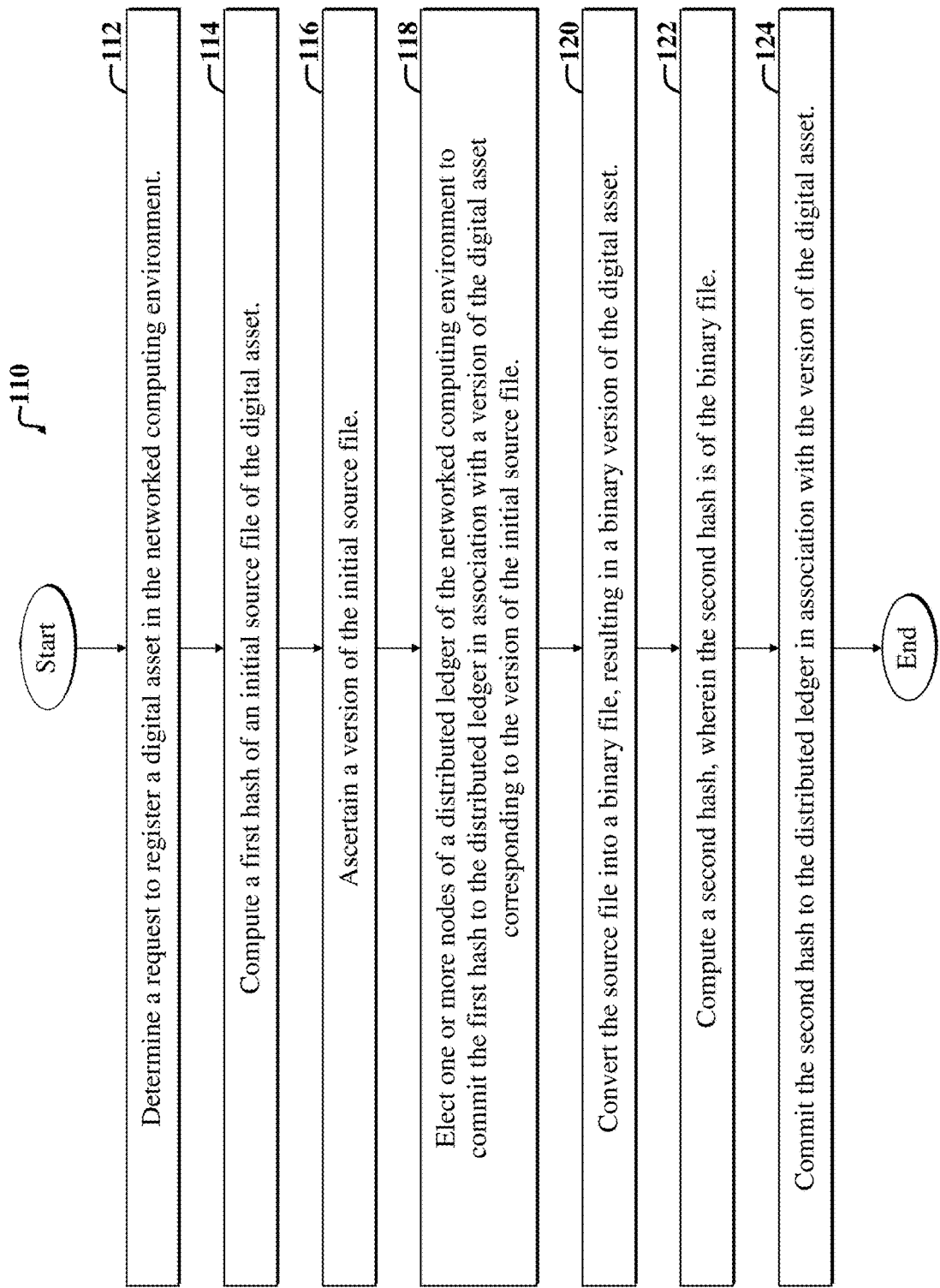
FIG. 3 is a flow diagram of a first example method, implementable via the computing environments of FIGS. 1-2, for facilitating digital asset traceability, etc.

FIG. 3 is a flow diagram of a first example method 110, implementable via the computing environments of FIGS. 1-2, for facilitating digital asset traceability, etc. The example method 110 links source and binary files by virtue of versioning applied to each, and includes a first step 112, which involves determining or otherwise receiving a request to register a digital asset in the networked computing environment.

With reference to FIGS. 1 and 3, the request may be issued by the workstation 12, which may communicate with the blockchain 18 via the one or more networked servers 14, i.e., blockchain nodes.

A second step 114 includes computing a first hash of an initial source file of the digital asset. With reference to FIGS. 1 and 3, the computation of the first hash may be implemented by the source hash function 32, and the source file corresponds to the source code files 26.

A third step 116 includes ascertaining a version of the initial source file. With reference to FIGS. 1 and 3, the version of the first source file can be determined by the version controller 36 and/or the provenance analyzer 42, e.g., by referencing source code registration information in the blockchain 18, which may include timestamp data pertaining to a particular source code version, the name of the code, etc. Note that version information can also be extracted, in some instances, by analyzing source file metadata sent along with the initial source code files 26 of FIG. 1.

A fourth step 118 includes electing one or more nodes of a distributed ledger of the networked computing environment to commit the first hash to the distributed ledger in association with a version of the digital asset corresponding to the version of the initial source file. With reference to FIGS. 1 and 3, the one or more nodes may correspond to the distributed servers 14, and the distributed ledger corresponds to the blockchain 18. The committal process may be implemented via one or more of the blockchain interfacing modules 44, e.g., in accordance with a consensus method, such as proof-of-stake, as set forth above.

A fifth step 120 includes converting the source file into a binary file, resulting in a binary version of the digital asset.

With reference to FIGS. 1 and 3, conversion of the source file into a binary file is performed by a compiler, such as the compiler 36.

A sixth step 122 includes computing a second hash, wherein the second hash is of the binary file. With reference to FIGS. 1 and 3, the computation of the second hash of the binary file can be performed by the binary hash function 34.

A seventh step 124 includes committing the second hash to the distributed ledger in association with the version of the digital asset. With reference to FIGS. 1 and 3, the committal process, involving verifying and registering a transaction containing the second hash and version information with the blockchain 18.

Note that the first example method 110 may be altered, without departing from the scope of the present teachings. For example, the method 110 may augmented to further specify a step of using the version information associated with the second hash and version information associated with the first hash to associate one or more binary file hashes in the distributed ledger with one or more source files in a source file repository, a workstation from which the source file originated, and a developer of the source file. The first example method 110 may further specify that the distributed ledger includes a blockchain, and wherein the digital asset includes software.

The first example method 110 may further include selectively making the binary file available to one or more client devices (e.g., corresponding to the consumer systems 20 of FIG. 1) and associated one or more respective authenticated and permissioned users (e.g., consumers using the consumer systems 20) of the networked computing environment, in accordance with one or more permissions allocated to the one or more authenticated and permissioned users. The one or more client devices include one or more computers of one or more customers of one or more cloud services provided in the networked computing environment.

Another optional step of the first example method 110 includes selectively making data in the blockchain accessible to the one or more client devices and accompanying one or more respective authenticated and permissioned users, whereby the one or more respective authenticated and permissioned users can compare a registered hash for the binary file in the blockchain with an obtained binary file. Public Key Infrastructure (PKI) and accompanying public key cryptography may be used to authenticate user permissions to access data in the blockchain.

The fourth step 118 may further include selecting, in accordance with a proof-of-stake mechanism, one or more nodes of the networked computing environment to implement committing the first hash, and for committing the second hash, to the blockchain. In a specific implementation, the proof-of-stake mechanism implements the following steps: referencing identifying information and associated permissions of the one or more nodes, to confirm that the one or more nodes are permissioned to commit one or more blocks to the blockchain, resulting in a set of one or more confirmed nodes; determining which of the one or more confirmed nodes first received a source file or binary file; selecting a node from among the one or more confirmed nodes to perform a calculation to commit a registration entry to the blockchain, resulting in a selected node; and using the selected node to commit the registration entry to the blockchain in combination with an indicator of the selected node that commits the registration entry to the blockchain as a block, whereby the block includes the indicator.

The first example method 110 may further specify the following steps: submitting the binary file to a production server; storing the source code in a source code repository that is accessible to one or more quality control mechanism; and storing the binary file in a binary code repository.

The first example method 110 may further include: updating the blockchain with updated source code registration information in response to detection that a new version of the source code is loaded into the source code repository, wherein the updated source code registration information includes information linking the updated source code with original source code; and updating the blockchain with updated binary registration information in response to detection that the new version of the source code has been compiled into a new binary file.

The request to register a digital asset may originate from a computer (e.g., the workstation 12 of FIG. 1) with which the source code was developed or from which it was submitted. The first hash may be implemented by a hash function that receives, as input, a digital fingerprint of the source code, a user IDentification (ID), a Central Processing Unit (CPU) ID, and a Media Access Control (MAC) address, all associated with or characterizing the computer.

The first hash function provides an output hash (e.g., output from the first hash function 32 of FIG. 1) that corresponds to the first hash, and which is accessible to one or more software quality control servers (e.g., the servers 14 of FIG. 1). The one or more quality control servers include functionality for selectively registering, in the distributed ledger (e.g., the blockchain 18 of FIG. 1), the first hash in association with source file version information.

Figure 4:
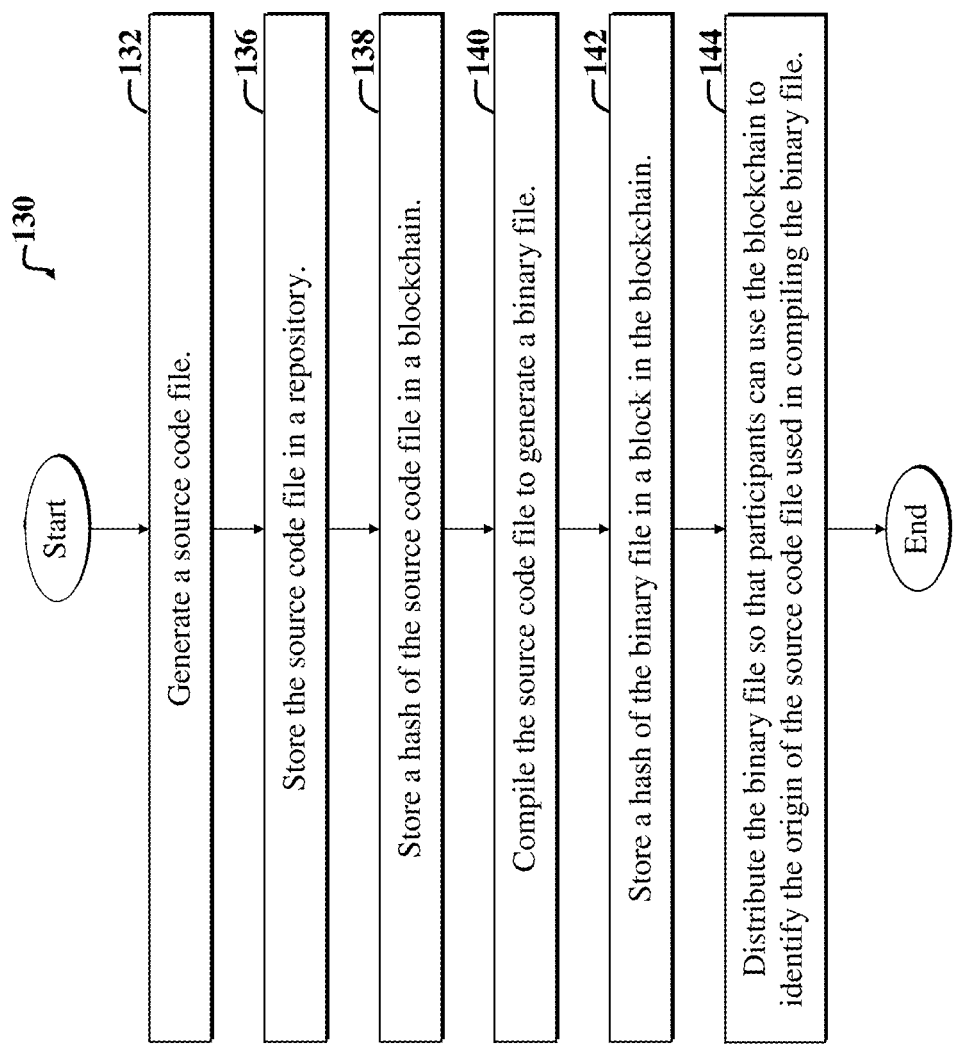
FIG. 4 is a flow diagram of a second example method implementable via the embodiments of FIGS. 1-3, for enabling users (consumers) to use the distributed ledger (blockchain) of FIGS. 1-2 to confirm that one or more binary files to be executed (run) have not been tampered with or corrupted.

FIG. 4 is a flow diagram of a second example method 130 implementable via the embodiments of FIGS. 1-3, for enabling ecosystem participants (e.g., consumers, developers, proprietors of production servers, etc.) to use the distributed ledger (blockchain) of FIGS. 1-2 to confirm that one or more binary files to be executed (run) have not been tampered with or corrupted.

The second example method includes an initial source-code generation step 132, which involves generating a source code file, e.g., using the developer tools 24 of FIG. 1.

Next, a source-code storing step 136 includes storing the source code file in a repository, e.g., the source code and hash repository 46 of FIG. 1.

Subsequently, a first hash-storing step 138 includes storing a hash of the source code file in a blockchain, e.g., the blockchain 18 of FIG. 1.

Next, a source-code compilation step 140 includes compiling (e.g., via the compiler 36 of FIG. 1) the source code file, resulting in a generated a binary file.

Next, a second hash-storing step 142 includes storing a hash of the binary file (i.e., binary hash) in a block in the blockchain.

Finally, a distribution step 144 includes distributing the binary file so that ecosystem participants can use the distributed ledger to identify the origin of the source code file used in compiling the binary file.

Note that the second method 130 may be altered, without departing from the scope of the present teachings. For example, the second example method 130 may further specify associating the binary file with the source code file (also simply called source file herein), e.g., by providing a blockchain mechanism (e.g., including registration functionality) to enable comparing a hash of the registered binary file with a hash of a binary file retrieved, responsive to user input; and then sending the binary file to one or more computing devices (e.g., the consumer systems 20 and/or production server 16 of FIG. 1) for installation and running.

Accordingly, registration entries in the blockchain for a particular binary file and source file include version information indicating a version of the source file and binary file, which can be used to trace a binary file back to its source file. Registered source code hashes can be further used to trace the associated source file back to the original developer and workstation, e.g., by virtue of the inputs to the first hash function 32 of FIG. 1, which include User ID and workstation identification information, such as CPU ID, MAC address, etc.

Traceability, as discussed herein, enabling linking binary files with corresponding source code files, enables various additional efficient solutions to long-felt needs in the art, including facilitating digital asset version control, code release sequencing, IP protection, software bug tracing, malware attack tracing and identification of the malware writer, and so on.

Note that in certain embodiments discussed herein, the historical record of the blockchain 18 is substantially immutable by one or more users of the workstation 12 and consumer systems 20 of FIG. 1.

An alternative method for facilitating digital asset traceability and facilitating software quality control in a networked computing environment includes receiving a source code file and an identification of a workstation from which the source file was received; computing a fingerprint of the source code file; calculating a first hash using the fingerprint of the source code file and the identification; selectively compiling the source code file, resulting in production of a binary file; calculating a second hash using the binary file; registering the first hash and second hash in a distributed ledger, in association with common software version, resulting in a first registration and a second registration; and using the first registration and the second registration to facilitate software quality control in the networked computing environment.

Figure 5:
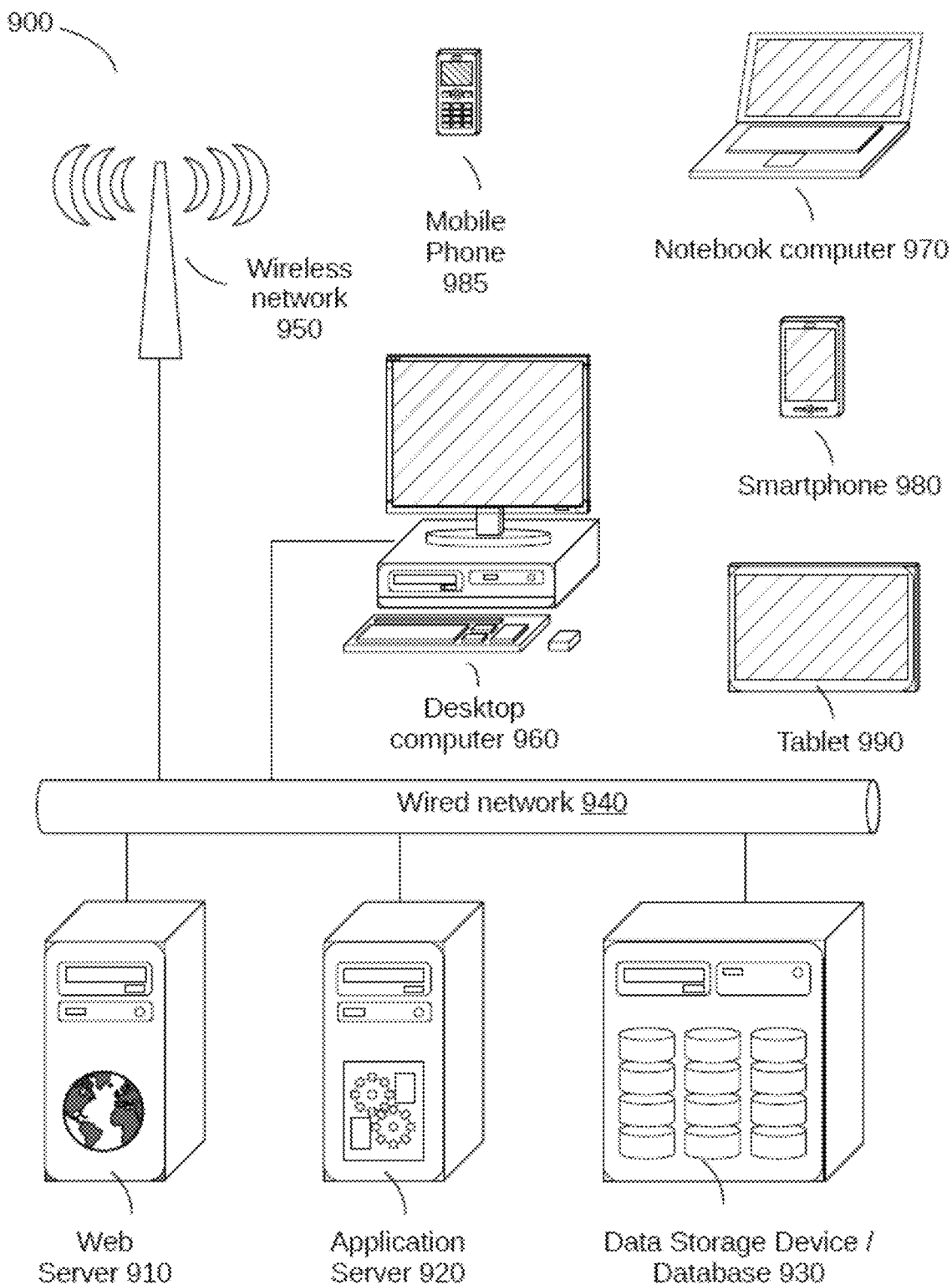
FIG. 5 is a general block diagram of a system and accompanying computing environment usable to implement the embodiments of FIGS. 1-4.

FIG. 5 is a general block diagram of a system 900 and accompanying computing environment usable to implement the embodiments of FIGS. 1-4. The example system 900 is capable of implementing a distributed software ecosystem according to embodiments of the invention. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

As an example, with reference to FIGS. 1 and 5, the web server 910, application server 920, and data storage device/database 930 of FIG. 5 may be used to implement the distributed ledger 18 of FIG. 1 by hosting server-side applications corresponding to the distributed servers 14, which are in turn accessible to individual computer systems via a browser. The workstations 12 and consumer systems 20 of FIG. 1 may be implemented by one or more of the desktop computer 960, tablet 900, smartphone 980, mobile phone 985, or notebook computer 970 of FIG. 5. The source code and hash repository 46 and binary code and hash repository 48 of FIG. 1 may be implemented via the data storage device/database 930 of FIG. 5.

Alternatively, or in addition, the individual computing devices 950, 985, 970, 980, 990 may run blockchain node software and accompanying functions (as shown in the servers 14 of FIG. 1) used to network the devices into a peer-to-peer software ecosystem to implement embodiments, using the wired network 940 and/or wireless network 950.

Figure 6:
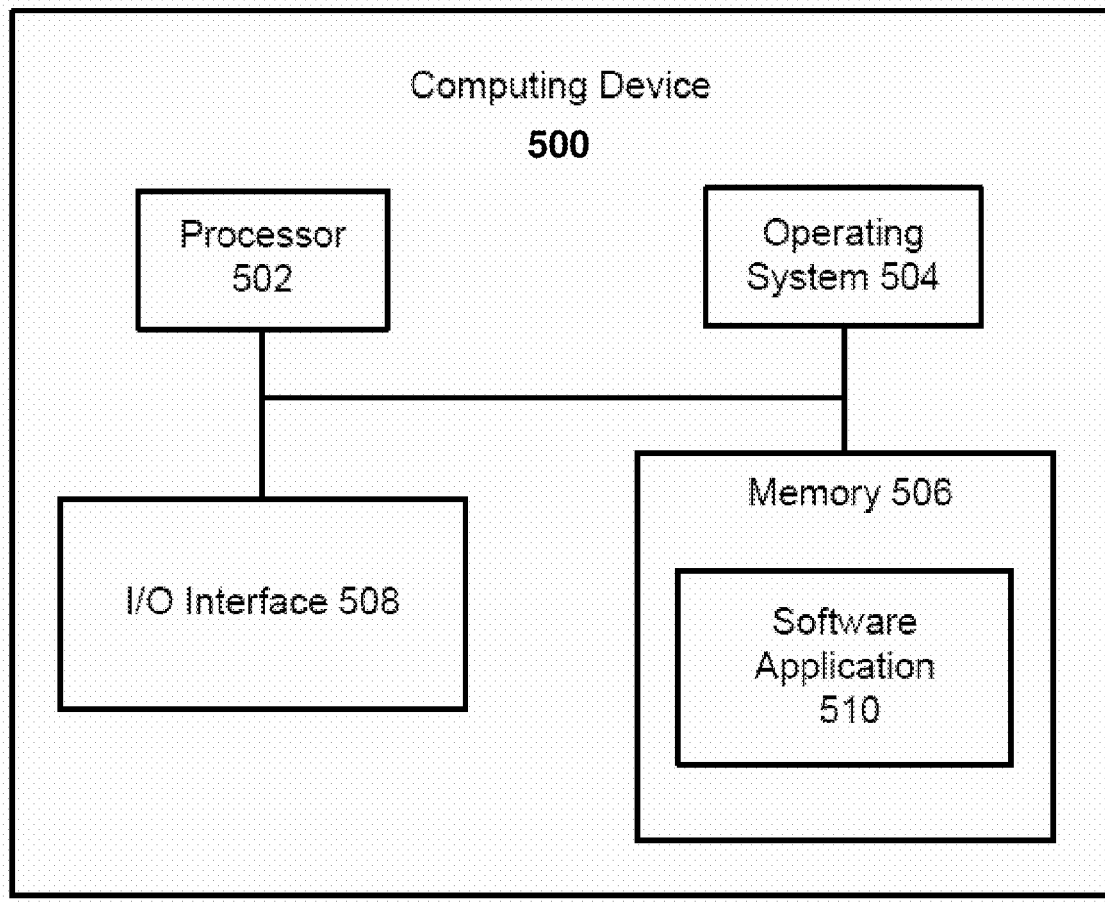
FIG. 6 is a general block diagram of a computing device usable to implement the embodiments of FIGS. 1-5.

FIG. 6 is a general block diagram of a computing device usable to implement the embodiments of FIGS. 1-5. While system 500 of FIG. 6 is described as facilitating performing the steps as described in certain implementations herein, any suitable component or combination of components of system 500 or any suitable processor or processors associated with system 500 may be used for performing the steps described.

FIG. 6 illustrates a block diagram of an example computing system 500, which may be used for implementations described herein. For example, computing system 500 may be used to implement server devices 910, 920 of FIG. 5 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 6 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

As an example, with reference to FIGS. 1 and 6, the computing device 500 of FIG. 6 may be used to implement the workstation 12 and consumer systems 20 of FIG. 1. The computing device 500 may also be used to implement each of the servers 14 of FIG. 1.

Although the description has been described with respect to particular embodiments thereof, these particular embodiments are merely illustrative, and not restrictive. For example, while certain embodiments discussed herein use a blockchain to maintain registration information related to software files (e.g., source or binary files for software applications), embodiments are not limited thereto. For example another type of database may be used in certain implementations without departing from the scope of the present teachings.

Furthermore, embodiments are not necessarily limited to use in linking and tracing software binary and source files. For example, versions of embodiments discussed herein could be used to selectively link music sheets or documents (e.g., containing written music) with corresponding digitized implementations of the music (e.g., MP3 files). This could facilitate copyright enforcement in a manner analogous to that used for software, as set forth above.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. One or more non-transitory tangible storage media including logic for execution by one or more processors and when executed facilitating digital asset tracing in a networked computing environment, comprising:
   determining a request to register a digital asset including software, in the networked computing environment;
   computing a first hash of an initial source file of the digital asset;
   ascertaining a version of the initial source file;
   electing one or more nodes of a distributed ledger of the networked computing environment including a blockchain, to commit the first hash to the distributed ledger in association with a version of the digital asset corresponding to the version of the initial source file and storing timestamp information associated with the committing of the first hash;
   converting the initial source file into a binary file, resulting in a binary version of the digital asset;
   computing a second hash, wherein the second hash is of the binary file;
   committing the second hash to the distributed ledger in association with the version of the digital asset;
   using version information associated with the second hash and version information associated with the first hash to associate one or more binary file hashes in the distributed ledger with one or more of: source files in a source file repository, a workstation from which the source file originated, or a developer of the source file;
   selectively making the binary file available to one or more client devices associated with one or more respective users of the networked computing environment, in accordance with one or more permissions allocated to the one or more respective users, wherein the one or more client devices include one or more computers of one or more respective customers of one or more cloud services provided in the networked computing environment; and
   using the timestamp information to establish a first developer to submit the initial source file.

2. The one or more non-transitory tangible storage media of claim 1, further including:
   selectively making data in the blockchain accessible to the one or more client devices and accompanying one or more users, whereby the one or more respective users can compare a registered hash for the binary file in the blockchain with an obtained binary file.

3. The one or more non-transitory tangible storage media of claim 2, further including:
   using Public Key Infrastructure (PKI) to authenticate user permissions to access data in the blockchain.

4. The one or more non-transitory tangible storage media of claim 1, wherein electing further includes:
   selecting, in accordance with a proof-of-stake mechanism, one or more nodes of the networked computing environment to implement committing the first hash, and for committing the second hash, to the blockchain, wherein the proof-of-stake mechanism implements steps comprising:
referencing identifying information and associated permissions of the one or more nodes, to confirm that the one or more nodes are permissioned to commit one or more blocks to the blockchain, resulting in a set of one or more confirmed nodes;
determining which of the one or more confirmed nodes first received a source file or binary file;
selecting a node from among the one or more confirmed nodes to perform a calculation to commit a registration entry to the blockchain, resulting in a selected node; and
using the selected node to commit the registration entry to the blockchain in combination with an indicator of the selected node that commits the registration entry to the blockchain as a block, whereby the block includes the indicator.

5. The one or more non-transitory tangible storage media of claim 4, further including:
submitting the binary file to a production server;
storing the source file in a source code repository that is accessible to one or more quality control mechanism; and
storing the binary file in a binary code repository.

6. The one or more non-transitory tangible storage media of claim 5, further including:
updating the blockchain with updated source file registration information in response to detection that a new version of the source file, called the updated source file, is loaded into the source code repository, wherein the updated source file registration information includes information linking the updated source file with the initial source file; and
updating the blockchain with updated binary registration information in response to detection that the updated source file version of the initial source file has been compiled into a new binary file.

7. The one or more non-transitory tangible storage media of claim 1, wherein the request to register a digital asset originates from a computer with which the initial source file was developed or from which it was submitted, and wherein the first hash is computed using a first hash function that receives, as input, a digital fingerprint of the source file, a user IDentification (ID), a Central Processing Unit (CPU) ID, and a Media Access Control (MAC) address, all associated with or characterizing the computer.

8. The one or more non-transitory tangible storage media of claim 7, wherein the first hash is accessible to one or more software quality control servers, and further including:
using the one or more software quality control servers to selectively register, in the distributed ledger, the first hash in association with source file version information.

9. A method for facilitating digital asset traceability in a networked computing environment, comprising:
determining a request to register a digital asset in the networked computing environment;
computing a first hash of an initial source file of the digital asset;
ascertaining a version of the initial source file;
electing one or more nodes of a distributed ledger of the networked computing environment to commit the first hash to the distributed ledger in association with a version of the digital asset corresponding to the version of the initial source file and storing timestamp information associated with the committing of the first hash;
converting the initial source file into a binary file, resulting in a binary version of the digital asset;
computing a second hash, wherein the second hash is of the binary file;
committing the second hash to the distributed ledger in association with the version of the digital asset;
using version information associated with the second hash and version information associated with the first hash to associate one or more binary file hashes in the distributed ledger with one or more of: source files in a source file repository, a workstation from which the source file originated, or a developer of the source file;
selectively making the binary file available to one or more client devices associated with one or more respective users of the networked computing environment, in accordance with one or more permissions allocated to the one or more respective users, wherein the one or more client devices include one or more computers of one or more respective customers of one or more cloud services provided in the networked computing environment; and
using the timestamp information to establish a first developer to submit the initial source file.

10. The method of claim 9, further including:
selectively making data in the blockchain accessible to the one or more client devices and accompanying one or more respective users, whereby the one or more respective users can compare a registered hash for the binary file in the blockchain with an obtained binary file.

11. The method of claim 10, further including:
using Public Key Infrastructure (PKI) to authenticate user permissions to access data in the blockchain.

12. The method of claim 9, wherein electing further includes:
selecting, in accordance with a proof-of-stake mechanism, one or more nodes of the networked computing environment to implement committing the first hash, and for committing the second hash, to the blockchain, wherein the proof-of-stake mechanism implements steps comprising:
referencing identifying information and associated permissions of the one or more nodes, to confirm that the one or more nodes are permissioned to commit one or more blocks to the blockchain, resulting in a set of one or more confirmed nodes;
determining which of the one or more confirmed nodes first received a source file or binary file;
selecting a node from among the one or more confirmed nodes to perform a calculation to commit a registration entry to the blockchain, resulting in a selected node; and
using the selected node to commit the registration entry to the blockchain in combination with an indicator of the selected node that commits the registration entry to the blockchain as a block, whereby the block includes the indicator.

13. The method of claim 12, further including:
submitting the binary file to a production server;
storing the source file in a source code repository that is accessible to one or more quality control mechanism; and
storing the binary file in a binary code repository.

14. The method of claim 13, further including:
updating the blockchain with updated source file registration information in response to detection that a new version of the source file, called the updated source file, is loaded into the source code repository, wherein the updated source file registration information includes information linking the updated source file with the initial source file; and updating the blockchain with updated binary registration information in response to detection that the updated source file version of the initial source file has been compiled into a new binary file.

15. The method of claim 9, wherein the request to register a digital asset originates from a computer with which the initial source file was developed or from which it was submitted, and wherein the first hash is implemented by a hash function that receives, as input, a digital fingerprint of the initial source file, a user IDentification (ID), a Central Processing Unit (CPU) ID, and a Media Access Control (MAC) address, all associated with or characterizing the computer, and wherein the first hash is accessible to one or more software quality control servers, and further including:

using the one or more software quality control servers to selectively register, in the distributed ledger, the first hash in association with source file version information.

16. An apparatus comprising:

one or more processors;

logic encoded in one or more non-transitory tangible media for execution by the one or more processors and when executed the logic is operable for:

determining a request to register a digital asset in a networked computing environment;

computing a first hash of an initial source file of the digital asset;

ascertaining a version of the initial source file;

electing one or more nodes of a distributed ledger of the networked computing environment to commit the first hash to the distributed ledger in association with a version of the digital asset corresponding to the version of the initial source file and storing timestamp information associated with the committing of the first hash;

converting the initial source file into a binary file, resulting in a binary version of the digital asset;

computing a second hash, wherein the second hash is of the binary file;

committing the second hash to the distributed ledger in association with the version of the digital asset;

using version information associated with the second hash and version information associated with the first hash to associate one or more binary file hashes in the distributed ledger with one or more of: source files in a source file repository, a workstation from which the source file originated, or a developer of the source file;

selectively making the binary file available to one or more client devices associated with one or more respective users of the networked computing environment, in accordance with one or more permissions allocated to the one or more respective users, wherein the one or more client devices include one or more computers of one or more respective customers of one or more cloud services provided in the networked computing environment; and using the timestamp information to establish a first developer to submit the initial source file.

* * * * *